United States Patent [19]

Thobor

[11] Patent Number: 5,719,203
[45] Date of Patent: Feb. 17, 1998

[54] BIODEGRADABLE COMPOSITION COMPRISING REGENERATIVE RAW MATERIAL AND METHOD OF PRODUCING THE SAME

[75] Inventor: Michael Thobor, Nuernberg, Germany

[73] Assignee: Metraplast H. Jung GmbH, Niederau, Germany

[21] Appl. No.: 776,905

[22] PCT Filed: Aug. 28, 1995

[86] PCT No.: PCT/EP95/03388

§ 371 Date: Feb. 14, 1997

§ 102(e) Date: Feb. 14, 1997

[87] PCT Pub. No.: WO96/06886

PCT Pub. Date: Mar. 7, 1996

[30] Foreign Application Priority Data

Aug. 27, 1994 [DE] Germany .............. 9413921 U

[51] Int. Cl.⁶ ............... C08L 3/02; C08L 1/02; C08L 7/00; B29C 45/46
[52] U.S. Cl. ............... 523/128; 524/9; 524/13; 524/35; 524/47; 264/142; 264/328.17; 264/328.18; 264/331.13
[58] Field of Search ............... 523/128; 524/9, 524/13, 35, 47; 264/140, 328.17, 328.18, 331.13

[56] References Cited

FOREIGN PATENT DOCUMENTS

| 2697259 | 4/1994 | France . |
|---|---|---|
| 4204083 | 3/1993 | Germany . |
| 2311544 | 12/1990 | Japan . |
| 94/14886 | 7/1994 | WIPO . |

OTHER PUBLICATIONS

M. Vert: "Biodegradables, réalités et perspectives"; In: Caoutchoucs et plastics, vol. 68, No. 706, 1991, pp. 71–76.

R.A. Buchanan et al.: "Powdered elastomers from starch-encased latex particles". In: Rubber Journal, Oct. 1971 USA, pp.28–35.

*Primary Examiner*—Peter A. Szekely
*Attorney, Agent, or Firm*—Spencer & Frank

[57] ABSTRACT

A method of producing a composition which is composed of from 5 to 50 wt. % of caoutchouc, preferably natural caoutchouc; from 4 to 25 wt. % of starch powder; from 10 to 50 wt. % of one of polybetahydroxybutyrate or cellulose; and from 0 to 15 wt. % of auxiliary agent, and which is biodegradable includes providing caoutchouc in one of flaked or granular form; providing initial materials selected from the group consisting of starch, polybetahydroxybutyrate, cellulose, and auxiliary agent, in ground form as one of a powder or granulated; homogeneously mixing the initial materials into the caoutchouc to provide a homogeneous mixture: plasticizing the homogeneous mixture by heating in one of a screw-type extruder or injection molding machine to provide a plasticized mass; and ejecting the plasticized mass from the extruder or injection-molding machine and allowing the mass to cool. Preferably, plasticizing is carried out of a temperature ranging from 170° C. to 180° C.

17 Claims, No Drawings

BIODEGRADABLE COMPOSITION COMPRISING REGENERATIVE RAW MATERIAL AND METHOD OF PRODUCING THE SAME

BACKGROUND OF THE INVENTION

1. Field of the Invention

The invention relates to a biodegradable material and a method of producing it. Biodegradable materials are those that decompose under the influence of environmental conditions and the action of destructive agents. Biodegradable materials are already known in which peas are used as the base material. It is also known to incorporate starch into conventional polymers to achieve partial degradability. In these starch-filled plastics, however, only the inserted starch component degrades, making the plastic matrix break down into numerous small pieces.

It is an object of the invention to propose a material that is completely biodegradable and is suited for incorporation therein round or fibrous particles to form composites.

SUMMARY OF THE INVENTION

This object is accomplished by providing a biodegradable material characterized by the following composition (wt. %):

| caoutchouc | 5 to 50% |
| starch powder | 4 to 25% |
| polybetahydroxybutyrate | 10 to 50% |
| auxiliary agents | 0 to 15%. |

The biodegradable material may alternatively be characterized by the following composition (wt. %):

| caoutchouc | 5 to 50% |
| starch powder | 4 to 25% |
| cellulose powder | 10 to 50% |
| auxiliary agents | 0 to 15%. |

The biodegradable material may have a thermoplastic matrix and be inserted, granulated or fibrous fillers comprising regenerative raw materials, characterized in that the matrix comprises

| caoutchouc | 5 to 50 wt. % |
| starch powder | 4 to 25 wt. % |
| polybetahydroxybutyrate | 10 to 50 wt. %. |

The biodegradable composite may have a thermoplastic matrix and be inserted, granulated or fibrous fillers comprising regenerative raw materials, characterized in that the matrix comprises

| caoutchouc | 5 to 50 wt. % |
| starch powder | 4 to 25 wt. % |
| cellulose powder | 10 to 50 wt. %. |

The biodegradable composite may have a thermoplastic matrix and be inserted, granulated or fibrous fillers comprising regenerative raw materials, characterized in that the matrix comprises

| caoutchouc | 5 to 50 wt. % |
| starch powder | 4 to 25 wt. % |
| polybetahydroxybutyrate/cellulose | 10 to 50 wt. %.—; |

All of these basic composition contain 5 to 50 wt. % of caoutchouc and 4 to 25 wt. % of starch. A third component is added to these base components of caoutchouc and starch in a proportion of 10 to 50%. This component is either polybetahydroxybutyrate or cellulose powder. The former is obtained through polymerization of beta-hydroxybutyric acid. It is also commercially available under the trade name "Biopol" (by Zeneca).

Caoutchouc is an essential component of the materials of the invention. Natural caoutchouc is preferred because it is completely biodegradable. However, it is also possible to use artificial caoutchoucs that are at least partially biodegradable, or that degrade after lengthy storage under conditions that encourage degradation, depending on the type of additives used. The starch powder and the third component, which is also essentially in powder form, are dispersed homogeneously in the base caoutchouc mass, and are no longer visible, at least to the naked eye. The material of the invention has more or less elasticity depending on the caoutchouc component. It is therefore better suited for the production of molded bodies in which elastic properties take priority over solidity and stability.

A crucial feature of composites is that sufficient adhesion exist between the inserted particles, for example round or fibrous particles, and the matrix material. The mechanical properties are basically determined by the quality of the boundary surfaces between the particles and the matrix. It has been seen that the basic composition according to invention can take in relatively large quantities of fillers or reinforcing agents in the manner of a GRP (glass fiber-reinforced plastic). According to the invention, granulated or fibrous materials comprising regenerative raw materials are used as reinforcing insertions. These raw materials can be, for example, ground grains or plant fibers. The materials obtained in this way are distinguished by a greater hardness and solidity in comparison to the basic material. They are therefore suited for the production of larger and, in particular, sheet molded bodies, for example, for parts for vehicle interior trim. Auxiliary agents can be added to the materials of the invention in proportions of up to about 15%. These agents include substances that modify the materials without significantly influencing their mechanical properties. Examples of such substances are solvents (e.g., stearin) for improving the plasticization of the initial materials in injection-molding machines or extruders (see below). They may also be dyes or animal-deterring agents.

A further object of the invention is to propose a method of producing the materials of the invention. Caoutchouc (in uncured form) is known to be a relatively tough, tacky, "rubberlike" mass into which it is difficult to incorporate powdered or granulated materials. This is the case for both artificial and natural caoutchouc. The latter is typically present in the form of so-called sheets that have already been obtained, in the country of origin, from the latex of the caoutchouc plant through evaporation of the water component. Working a powder, such as starch or cellulose or more coarse-grained particles, into this type of caoutchouc mass would require heavy-duty cutting and kneading machines that use a tremendous amount of energy. The invention proposes using the caoutchouc in the form of flakes or grains. In this form it can easily be mixed homogeneously with the other components in simple mixers. Caoutchouc is commercially available in flakes or grains. In the next method step, the initial mixture obtained in this way is plasticized by heating in a conventional screw-type extruder or a conventional injection-molding machine. During this treatment, the caoutchouc flakes or grains are heated to a softening temperature. The individual components of the initial mixture are mixed thoroughly by the action of the screw and an extruder, as well as that of an injection-molding machine. The tough, tacky caoutchouc typically tends to solidify on the screw and the inside walls of the screw chamber of the above-mentioned machines. This effect is contrary to homogeneous, thorough mixing of the components. It also leads to increased friction and thus to an increase in the temperature of the mass to be processed. The increase in temperature results in undesired changes, particularly hardening of the caoutchouc. If, however, caoutchouc flakes or grains are processed, in accordance with the invention, in a mixture with the above-cited components in the extruder or injection-molding machine, this effect is avoided. The caoutchouc is effectively prevented from sticking to the screw and the inside machine walls by the fact that the individual caoutchouc particles are surrounded, at least in the initial stage of plasticization, by a powdered casing in the screw chamber. During the further course of processing, the individual caoutchouc flakes particles combine to form a homogeneous base mass in which the additives are uniformly distributed. The result of processing in the screw chamber of the above-cited machines is therefore a plasticized mass that can be extruded and injected. As the next method step, this mass is either extruded in the form of a strand or injected into a mold. In the former case, the extruded material strand is ground, that is, granulated. The material of the invention is then present in granular form, and can be kept in intermediate storage for a practically arbitrary length of time and used to produce injection-molded parts. In the latter case, the material of the invention is injected directly into a mold, and the desired molded part is obtained in a direct manner.

It has proven advantageous to maintain a temperature of 170° C. to 180° C. during plasticization of the initial mass in the screw chamber. At temperatures below 170° C., the caoutchouc cannot be sufficiently softened, so the additives cannot be satisfactorily worked in. However, other temperature effects could also have an impact. In particular, at the dominant temperatures, the added natural substances experience a significant change and conversion that could have a significant impact on the material properties. For this reason, the temperature cannot be increased greatly above 180° C. The natural substances, comprising primarily starch, cellulose and proteins, are changed so much at the higher temperatures that the obtained material no longer possesses the desired properties. In particular, carbon-containing components such as cellulose or starch can burn or carbonize. The material of the invention is able to take in a maximum filler component of 65%. Consequently, a broad spectrum of composites can be produced that possess widely-varying graduations of solidity and hardness.

DESCRIPTION OF THE PREFERRED EMBODIMENTS

Injection-molded parts such as cups, plates, bowls and parts for vehicle interior trim, were produced with the composites of the invention. The produced bodies were inspected closely and tested with regard to their suitability. Test pieces were also produced for collecting characteristic data, as explained below. All of these experiments revealed that materials having particularly advantageous properties can be obtained if the following composition is maintained (wt. %):

| | |
|---|---|
| caoutchouc | 10 to 30% |
| potato starch | 5 to 15% |
| polybetahydroxybutyrate/cellulose | 20 to 30% |
| fillers | 20 to 60% |
| auxiliary agents | max. 10% |

Granular materials and fibers of a wide variety of plants can be used as fillers for composites. In particular, granular materials from grain seeds such as corn, rye and wheat are considered. The fibers of Chinese grass or the capsular fruits of the kapok tree, for example, are considered as fibrous materials. Wood fibers or cotton fibers can also be used.

If the proportion of fillers exceeds 60%, the composite becomes noticeably brittle. The base matrix comprising caoutchouc, potato starch and polybetahydroxybutyrate (hereinafter referred to as PBHB) or cellulose, respectively, is no longer capable of holding together the inserted particles; its absorptive capability is partly exceeded. The material also becomes brittle if the caoutchouc proportion drops below 10%. With caoutchouc contents of more than 30%, the material becomes increasingly elastic, and loses more and more of the properties of a composite, namely hardness and solidity. With a filler content of more than about 60%, the mechanical properties worsen noticeably. In particular, the tensile strength decreases. The regenerative raw material additives are hydrophilic by nature, that is, they absorb water. If the proportion of inserted regenerative raw materials is more than 60%, the swelling property of the composite reaches an intolerable degree. Moreover, high particle proportions impede the uniform dispersement during plasticization. Auxiliary agents such as citric acid, used to protect against animal damage (deters rodents like mice and rats), or stearin as a solvent should be limited to a total proportion of 10% to essentially preclude a negative influence on the mechanical properties.

The advantage of using popped grains such as popcorn is that composites of lower density can be obtained. The fact that these materials contain air also increases the thermal insulating capability of the composites.

The invention is described by way of examples:

EXAMPLE 1

| | |
|---|---|
| natural caoutchouc flakes | 26% |
| potato starch | 6% |
| popcorn | 13% |
| rye | 26% |
| PBHB | 26% |
| citric acid | 4% |

EXAMPLE 2

| | |
|---|---|
| natural caoutchouc flakes | 19% |
| potato starch | 12% |
| oats | 19% |
| popcorn | 12% |
| dammar resin | 12% |
| PBHB | 19% |
| citric acid | 3% |
| stearin | 2% |
| gelatin powder | 2% |

EXAMPLE 3

| | |
|---|---|
| natural caoutchouc flakes | 13% |
| potato starch | 13% |
| oats | 13% |
| rye | 26% |
| PBHB | 20% |
| stearin | 3% |
| citric acid | 3% |
| gelatin powder | 2% |
| popcorn | 7% |

Stearin was added to the compositions of Examples 1 through 3 as a solvent. The "base matrix" of these compositions comprises caoutchouc, potato starch and PBHB. In the above examples, as well as in examples discussed below, potato starch was used as a base component of the base matrix, particularly for cost reasons. However, other types of starch, such as rice, corn or grain starches, can also be used.

A composite according to the invention was produced as follows:

The flaked or granular caoutchouc was mixed homogeneously with the remaining components in a conventional mixer. At least the potato starch was present as a powder or flour, while the fillers, that is, popcorn, rye and oats, were present in granular form. After mixing, the latex flakes were uniformly distributed in the other components, or vice versa. The initial mixture prepared in this way was plasticized in a 75-ton injection-molding machine. It was poured into the filling hopper of the machine, through which it traveled into the screw chamber. The machine was heated such that the mass located in the screw chamber had a temperature of 170° C. to 180° C. Caoutchouc softens in this temperature range. The fillers and auxiliary agents were worked into the caoutchouc matrix by the rotation of the screw. At the dominant temperature, the added natural substances also changed. Experiments to explore this have not yet been undertaken. It is assumed, however, that the temperature effect on the natural substances in the screw chamber is not insignificant for the properties of the later material. The caoutchouc flakes, which are by nature sticky, at least in the heated state, were prevented from solidifying on the screw or the inside walls of the screw chamber by the encasing of the caoutchouc flakes with starch powder or other powdered components. The mass was fully plasticized in the screw chamber after 1 minute at the latest.

Different molded bodies, such as cups, bowls and test pieces, were injected with the plasticized mass. In the tests described below, the test pieces were used to determine characteristic mechanical data. The compositions of Examples through 3 are hereinafter referred to as Z1, Z2 and Z3.

Bending Test in Accordance with DIN 53452

TABLE 1

| | Flexural strength (N/mm$^2$) | | |
|---|---|---|---|
| Test No. | Z1 | Z2 | Z3 |
| 1 | 23.38 | 22.22 | 40.42 |
| 2 | 25.09 | 21.17 | 43.17 |
| 3 | 23.39 | 21.55 | 37.36 |
| 4 | 23.86 | 19.43 | 41.29 |

TABLE 1-continued

| | Flexural strength (N/mm$^2$) | | |
|---|---|---|---|
| Test No. | Z1 | Z2 | Z3 |
| 5 | 20.91 | 19.54 | 38.62 |
| average flexural strength | 23.33 | 20.78 | 40.17 |

TABLE 2

| | Expansion at Maximum Force (%) | | |
|---|---|---|---|
| Test No. | Z1 | Z2 | Z3 |
| 1 | 2.35 | 3.14 | 3.21 |
| 2 | 3.00 | 2.36 | 3.14 |
| 3 | 2.47 | 2.57 | 2.86 |
| 4 | 2.23 | 2.71 | 3.08 |
| 5 | 1.68 | 2.28 | 3.05 |
| average expansion at maximum force | 2.35 | 2.61 | 3.07 |

Test pieces having a rectangular, average cross section of 4.16 mm×9.89 mm were used in the bending tests according to Tables 1 and 2. The test speed was 2 mm/min.

Determination of the Modulus of Elasticity in the Bending Test in Accordance with DIN 53457

Test pieces having an average thickness of 4.1 mm and an average width of 9.9 mm were tested.

TABLE 3

| | Modulus of Elasticity (N/mm$^2$) | | |
|---|---|---|---|
| Test No. | Z1 | Z2 | Z3 |
| 1 | 1821.2 | 1270.1 | 1749.9 |
| 1 | 1821.2 | 1270.1 | 1749.9 |
| 2 | 1707.3 | 1472.5 | 1844.7 |
| 3 | 1725.0 | 1177.3 | 1881.4 |
| average modulus of elasticity | 1751.2 | 1306.6 | 1825.3 |

Determination of the Length Expansion Coefficient

Test pieces having dimensions of 15×10.5×117 mm were injected from compositions Z1 and Z2. The length expansion was determined at a heating speed of 120 K/h. All three tests reveal a relatively constant course of expansion up to about 80° C. The expansion coefficient α of this constant range is shown in Table 4.

TABLE 4

| Expansion Coefficient [10-5K-1]: | | |
|---|---|---|
| Z1 | Z2 | Z3 |
| 12.5 | 13.9 | 12 |

Determination of the Melt-Flow Index in Accordance with DIN 53735

This test was only performed with material having the Example 1 (Z1) composition. The test temperature was 190°

C. Small pieces of a test mass were placed in a test cylinder and heated to determine the heat-flow index. On its underside, the test cylinder has a nozzle from which the softened mass is pressed out as a strand by a pressing stamp (load 2.61 kp) inserted into the test cylinder. As a result, an MFI (Melt Flow Index) of 2.59 g/10 min. could be ascertained.

Determination of Burning Behavior in Accordance with DIN 75200

The determination of burning behavior is required particularly for materials for vehicle interior appointments. Plates were produced in accordance with the injection-molding method and stored over a period of 48 hours at standard climate (23° C., 50% relative air humidity). The plates possessed dimensions of 139 mm×79 mm×3 mm. The plates were ignited at one edge, and the path and time of burning were determined. Five samples of each composition (Z1 through Z3) were tested. The following table summarizes the average burning speed and the maximum burning speed of the respective 5 samples.

TABLE 5

Burning Behavior (Average and Max. Burning speeds in mm/min)

| | Z1 | Z2 | Z3 |
|---|---|---|---|
| average burning speed | 33.4 | 18.2 | 44.4 |
| maximum burning speed | 39.8 | 19.9 | 49.0 |

Determination of Density

To determine density, injection-molded plates measuring 2.9 mm×79 mm×139 mm were weighed with precision of 0.001 g. The plates were measured to determine their volume, and density was calculated from the values for volume and the masses.

TABLE 6

Density (g/cm$^3$)

| | Z1 | Z2 | Z3 |
|---|---|---|---|
| average density | 1.24 | 1.23 | 1.20 |

Determination of Absolute Moisture Content in Accordance with DIN 52351

To determine the relative moisture, plates of compositions Z1, Z2 and Z3 were stored for 48 hours under standard climate conditions (23° C., 50% relative air humidity) and, afterward, their weight gain with respect to the dry state after storage in moist air and in water was determined. The results are summarized in Table 7.

TABLE 7

Average Absolute Moisture Content (%):

| | Z1 | Z2 | Z3 |
|---|---|---|---|
| avg. absolute moisture content | 0.21 | 0.81 | 0.43 |

Determination of Water Absorption and Swelling Based on DIN 52351

To determine water absorption and swelling, plates made from materials of compositions Z1, Z2 and Z3 were first stored for 48 at a standard climate (23° C., 50% relative air humidity). A portion of the samples were stored in moist air (95% relative air humidity, 55° C.), and the average changes in thickness and mass were determined as a percentage value after 24, 48, 72 and 96 hours.

TABLE 8

Average Thicknesses and Average Change in Mass (change in thickness Δd and change in mass Δm in %) during storage in moist air and in water

| Δ | | Z1 | Z2 | Z3 |
|---|---|---|---|---|
| Δd/Δm after storage in air | 24 h | 0.00/0.61 | 1.54/1.25 | 0.96/0.86 |
| | 48 h | 0.27/0.68 | 1.54/1.25 | 0.96/0.94 |
| | 72 h | 0.83/0.68 | 1.54/1.25 | 0.96/0.94 |
| | 96 h | — | — | — |
| Δd/Δm after storage in water | 24 h | 11.24/2.14 | 15.85/3.76 | 2.25/0.96 |
| | 48 h | 13.61/2.83 | 15.85/5.12 | 3.46/1.52 |
| | 72 h | 14.87/3.56 | 16.69/6.35 | 3.46/1.86 |
| | 96 h | 14.87/4.19 | 16.69/7.33 | 3.46/2.19 |

Determination of Tension and Expansion in the Tensile Test in Accordance with DIN 53455

Test rods having an average thickness of 4 mm and an average width of 10 mm (standard rod No. 3) were produced from compositions Z1–Z3. Tensile strength and expansion were determined once at a test speed of 5 mm/min and another time at 50 mm/min. Expansion was determined—in deviation from the DIN standard—from the change in spacing of the clamping jaws. The test results are summarized in Tables 9 and 10.

TABLE 9

Tensile Strength (N/mm$^2$)

| | Z1 | | Z2 | | Z3 | |
|---|---|---|---|---|---|---|
| Test No. | 5 mm/min | 50 mm/min | 5 mm/min | 50 mm/min | 5 mm/min | 50 mm/min |
| 1 | 5.92 | 7.94 | 14.11 | 14.69 | 12.10 | 14.01 |
| 2 | 6.79 | 6.65 | 13.46 | 10.98 | 11.68 | 16.86 |
| 3 | 6.64 | 7.04 | 10.13 | 13.35 | 11.73 | 19.48 |
| 4 | 6.83 | 7.84 | 11.18 | 13.01 | 11.43 | 13.98 |
| 5 | 6.57 | 12.05 | 14.05 | 16.49 | 11.10 | 13.42 |
| avg. tensile strength | 6.55 | 8.30 | 12.57 | 13.70 | 11.61 | 15.55 |

TABLE 10

| | Expansion at Maximum Force (%) | | | | | |
|---|---|---|---|---|---|---|
| | Z1 | | Z2 | | Z3 | |
| Test No. | 5 mm/min | 50 mm/min | 5 mm/min | 50 mm/min | 5 mm/min | 50 mm/min |
| 1 | 6.54 | 8.54 | 9.22 | 9.16 | 11.84 | 13.46 |
| 2 | 6.86 | 7.30 | 7.86 | 8.76 | 11.92 | 14.04 |
| 3 | 7.16 | 8.86 | 8.00 | 6.80 | 12.00 | 15.84 |
| 4 | 7.92 | 8.66 | 8.78 | 7.60 | 11.32 | 12.62 |
| 5 | 7.18 | 8.66 | 8.76 | 10.10 | 12.56 | 10.84 |
| avg. expansion at maximum force | 7.13 | 8.44 | 8.52 | 8.48 | 11.93 | 13.36 |

In addition to the above-described Examples 1–3, other materials having widely-varying compositions were produced and processed in accordance with the injection-molding method. Bowls, cups and plate-shaped injection-molded parts were produced. The components and content ranges of these examples are summarized in Table 11.

TABLE 11

| | Examples 4–19 (Contents in % by weight) | | | | | | | | | | | | | | | | |
|---|---|---|---|---|---|---|---|---|---|---|---|---|---|---|---|---|---|
| | Examples | | | | | | | | | | | | | | | | |
| | 4 | 5 | 6 | 7 | 8 | 9 | 10 | 11 | 12 | 13 | 14 | 15 | 16 | 17 | 18 | 19 |
| Base matrix, total | 50 | 70 | 33.4 | 60 | 80 | 80 | 80 | 75 | 63.4 | 65.8 | 68.7 | 82.5 | 60 | 85 | 66.6 | 53.5 |
| Flake caoutchouc | 10 | 20 | 6.3 | 10 | 30 | 40 | 50 | 25 | 6.7 | 9.9 | 21.5 | 8 | 6 | 25 | 8.3 | 4.1 |
| Potato starch | 10 | 10 | 6.3 | — | 10 | 20 | 20 | — | 10 | 6.2 | 4.3 | 5.3 | 4 | 10 | 8.3 | 4.1 |
| "PBHB" | 30 | 20 | 20.8 | 10 | 20 | — | 10 | 25 | 46.7 | — | — | 53.2 | 26 | 50 | 25 | 41.2 |
| Celluose powder | — | 20 | — | 40 | 20 | 20 | — | 25 | — | 49.7 | 42.9 | 16 | 24 | — | 25 | 4.1 |
| Fillers, total | 40 | 30 | 56.3 | 40 | 20 | 20 | 20 | 25 | 36.8 | 31 | 21.5 | 5.3 | 38 | 15 | 33.4 | 34.1 |
| Popcorn | — | — | — | — | — | — | — | — | 6.7 | 9.3 | 4.3 | — | — | — | — | — |
| Rye | — | — | — | — | — | — | — | — | 10 | 3.1 | — | — | 18 | — | — | — |
| Oats | — | — | — | — | — | — | — | — | 6.7 | — | — | — | — | — | — | — |
| Corn | 40 | 30 | 56.3 | 40 | 20 | 20 | 20 | 25 | 6.7 | 12.4 | 4.3 | 5.3 | 16 | 15 | 16.7 | 21.8 |
| Soy | — | — | — | — | — | — | — | — | 6.7 | 6.2 | — | — | 4 | — | 16.7 | 8.2 |
| Slate powder | — | — | — | — | — | — | — | — | — | — | 12.9 | — | — | — | — | 4.1 |
| Auxiliary agents, total | 10 | — | 10.5 | — | — | — | — | — | — | 3.1 | 9.9 | 12.2 | 2 | — | — | 12.3 |
| Lemon juice | — | — | — | — | — | — | — | — | — | 3.1 | 1.3 | 1.6 | — | — | — | 4.1 |
| Dammar resin | 10 | — | 6.3 | — | — | — | — | — | — | — | 4.3 | 5.3 | 1 | — | — | 4.1 |
| Stearin | — | — | — | — | — | — | — | — | — | — | 4.3 | 5.3 | — | — | — | 4.1 |
| Gelatine powder | — | — | 4.2 | — | — | — | — | — | — | — | — | — | 1 | — | — | — |

What is claimed is:

1. A composition which is biodegradable, comprising:
   from 5 to 50 wt. % of caoutchouc;
   from 4 to 25 wt. % of starch powder;
   from 10 to 50 wt. % of one of polybetahydroxybutyrate or cellulose; and
   from 0 to 15 wt. % of auxiliary agent.

2. The composition according to claim 1, wherein the caoutchouc is a natural caoutchouc.

3. A composite which is biodegradable, comprising:
   a thermoplastic matrix comprised of:
      from 5 to 50 wt. % of caoutchouc;
      from 4 to 25 wt. % of starch powder; and
      from 10 to 50 wt. % of one of polybetahydroxybutyrate or cellulose;
   from 0 to 15 wt. % of auxiliary agent; and
   filler which is one of granulated or fibrous and which is comprised of regenerative raw materials.

4. The composite according to claim 3, wherein the filler is present in an amount which does not exceed 65 wt. %.

5. The composite according to claim 3, wherein the caoutchouc is a natural caoutchouc.

6. A composition which is biodegradable, comprising:
   from 10 to 30 wt. % of caoutchouc;
   from 5 to 15 wt. % of potato starch;
   from 20 to 30 wt. % of one of polybetahydroxybutyrate or cellulose;
   from 25 to 60 wt. % of filler; and
   from 0 to 10 wt % of auxiliary agent.

7. The composition according to claim 6, wherein the filler is selected from the group consisting of grain seed, plant fiber, popped grain granulate, and mixtures thereof.

8. The composition according to claim 6, wherein the caoutchouc is a natural caoutchouc.

9. A composition which is biodegradable, comprising:
   26 wt. % of natural caoutchouc;
   6 wt. % of potato starch;
   13 wt. % of popcorn,
   26 wt. % of rye;
   25 wt. % of polybetahydroxybutyrate; and
   4.% of citric acid.

10. A composition which is biodegradable, comprising:
    19 wt. % of natural caoutchouc;
    12 wt. % of potato starch;
    19 wt. % of oats;
    12 wt. % of popcorn;
    12 wt. % of dammar resin;
    19 wt. % of polybetahydroxybutyrate;
    3 wt. % of citric acid;
    2 wt. % of stearin; and
    2 wt. % of gelatin powder.

11. A composition which is biodegradable, comprising:
    13 wt. % of natural caoutchouc;
    13 wt. % of potato starch;
    13 wt. % of oats;
    26 wt. % of rye;
    20 wt. % of polybetahydroxybutyrate;
    3 wt. % of stearin;
    3 wt. % of citric acid;
    2 wt. % of gelatin powder; and
    7 wt. % of popcorn.

12. A method of producing a composition which is biodegradable, comprising:
    a) providing caoutchouc in one of flaked or granular form;
    b) providing initial materials in ground form as one of a powder or granulated and comprised of:
       from 5 to 50 wt. % of caoutchouc;
       from 4 to 25 wt. % of starch;
       from 10 to 50 wt. % of one of polybetahydroxybutyrate or cellulose; and
       from 0 to 15 wt. % of auxiliary agent;
    c) homogeneously mixing the initial materials into the caoutchouc to provide a homogeneous mixture;
    d) plasticizing the homogeneous mixture by heating in one of a screw-type extruder or injection molding machine to provide a plasticized mass; and
    e) ejecting the plasticized mass from the extruder or injection-molding machine and allowing the mass to cool.

13. The method according to claim 12, wherein plasticizing in step (d) is carried out of a temperature ranging from 170° C. to 180° C.

14. The method according to claim 12, wherein the caoutchouc provided is a natural caoutchouc.

15. A method for producing injection-molded parts, comprising:
    grinding the mass obtained according to claim 12 to provide a ground mass; and
    utilizing the ground mass as an initial material for producing said injection-molded parts.

16. A method for producing injection-molded parts, comprising:
    grinding the mass obtained according to claim 13 to provide a ground mass; and
    utilizing the ground mass as an initial material for producing said injection-molded parts.

17. A method of producing a composite which is biodegradable, comprising:
    a) providing caoutchouc in one of flaked or granular form;
    b) providing initial materials in ground form as one of a powder or granulated and comprised of:
       from 5 to 50 wt. % of caoutchouc;
       from 4 to 25 wt. % of starch;
       from 10 to 50 wt. % of one of polybetahydroxybutyrate or cellulose;
       from 0 to 15 wt. % of auxiliary agent; and
       up to 65 wt. % of filler which is one of granulated or fibrous and which is comprised of regenerative raw materials;
    c) homogeneously mixing the initial materials into the caoutchouc to provide a homogeneous mixture;
    d) plasticizing the homogeneous mixture by heating in one of a screw-type extruder or injection molding machine to provide a plasticized mass; and
    e) ejecting the plasticized mass from the extruder or injection-molding machine and allowing the mass to cool.

* * * * *